June 30, 1970  W. W. HOUGHTON ET AL  3,517,562

INERTIAL GYROSCOPE

Filed Sept. 12, 1967

INVENTORS
WARREN W. HOUGHTON
GERALD M. NEARMAN
ROBERT C. ROYCE

BY

ATTORNEY

June 30, 1970    W. W. HOUGHTON ET AL    3,517,562
INERTIAL GYROSCOPE

Filed Sept. 12, 1967    2 Sheets-Sheet 2

INVENTORS
WARREN W. HOUGHTON
GERALD M. NEARMAN
ROBERT C. ROYCE

BY
ATTORNEY

United States Patent Office 3,517,562
Patented June 30, 1970

3,517,562
INERTIAL GYROSCOPE
Warren W. Houghton, Framingham, Gerald M. Nearman, Manchester, and Robert C. Royce, Framingham, Mass., assignors to Raytheon Company, Lexington, Mass., a corporation of Delaware
Filed Sept. 12, 1967, Ser. No. 667,238
Int. Cl. G01c 19/28
U.S. Cl. 74—5.6          5 Claims

ABSTRACT OF THE DISCLOSURE

An inertial gyroscope having an umbrella-shaped rotor gim-balled on spherical ball bearing means with an assembly of stator coils combined with a hysteresis ring carried by the rotor for actuation of positional pickoff and torquer functions. The spherical ball bearing means provides complete rotation about the spin axis and limited pivotal movement about the two orthogonal axes with resultant three-degrees-of-freedom in a unitary assembly.

BACKGROUND OF THE INVENTION

The present invention relates to the field of gyroscopes and in particular to such devices for stabilized platform applications. In the past platform gyros have been constructed utilizing two individual gimbals supporting the rotor to provide the two sensing axes. Instrumentation platforms have been stabilized aboard rapidly moving vehicles such as missiles and airplanes by means of gyroscopic devices. In airborne applications utilizing inertial guidance and navigation systems gyroscopic devices must be capable of extremely high degrees of accuracy since very small drifts in the device may lead to a navigational error of many nautical miles from the target. Wider use of gyroscopic devices in inertial equipment, however, has been limited primarily by the unavailability of suitable low cost devices. An example of an applicable system is the tactical missile mid-course guidance system operating in the mid-range of the over-all inertial spectrum. A need exists, therefore, in the art for a simplified inertial gyroscope for a platform environment having a high degree of reliability and low production cost.

SUMMARY OF THE INVENTION

In accordance with the teachings of the present invention an inertial gyroscope is provided having a spherical bearing combining the functions of the spin axis bearings as well as the two gimbals and their associated bearings in an integral assembly. The spherical bearing thereby provides what will be hereinafter referred to as three-degrees-of-freedom. An integral coil assembly mounted to the outside diameter of the spherical bearing carries the motor drive coils, signal generator pickoff coils and the torquer coils which cooperate with a hysteresis ring carried by a rotor. In addition, a fixed stop protects the rotor from exceeding its angular limits in two axes. The components are housed within a hermetically sealed case which is filled with an inert gas. The gyroscope with the spherical bearing has unlimited freedom about the spin axis and freedom of approximately ±5° in each of the two orthogonal axes.

The combination of the spherical ball bearing and unitary assembly of the motor, pickoff and torquer functions has resulted in a device having a minimum number of critical parts which thereby minimizes the time and skills required for assembly and test as well as overall expense. Included in the eliminated parts are: slip rings, flex leads, gimbals, separate gimbal bearings, fluid, dampers and heaters, together with thermal sensors and other related parts. The resultant gyroscope instrument is ideally suited for stabilized platform applications and is compatible with existing inertial hardware.

DESCRIPTION OF THE PREFERRED EMBODIMENT

Figure 1:
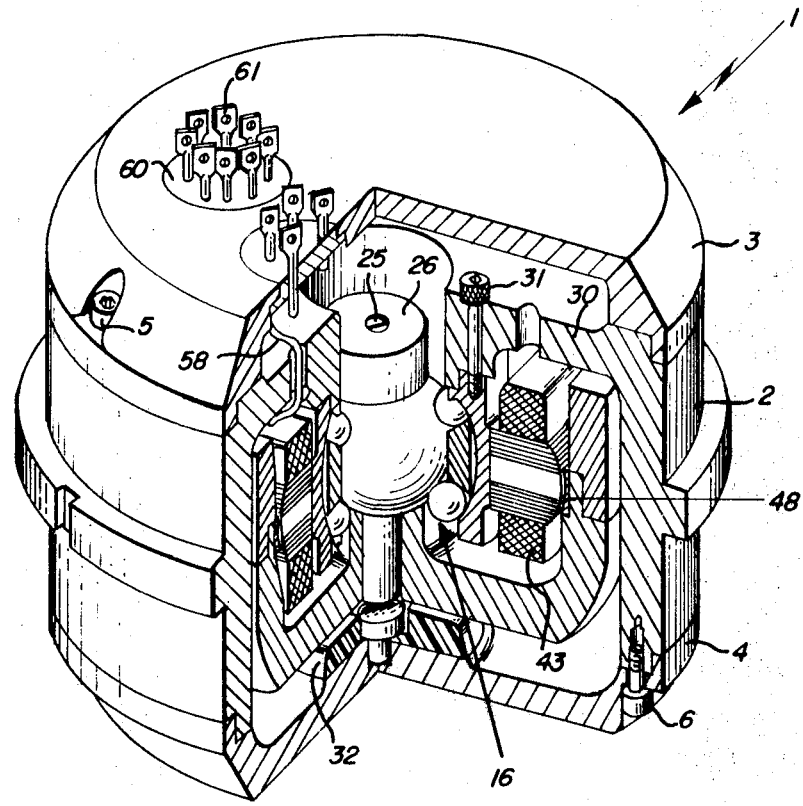
FIG. 1 is a perspective view partially cut away of the illustrative embodiment of the invention.
Figure 2:
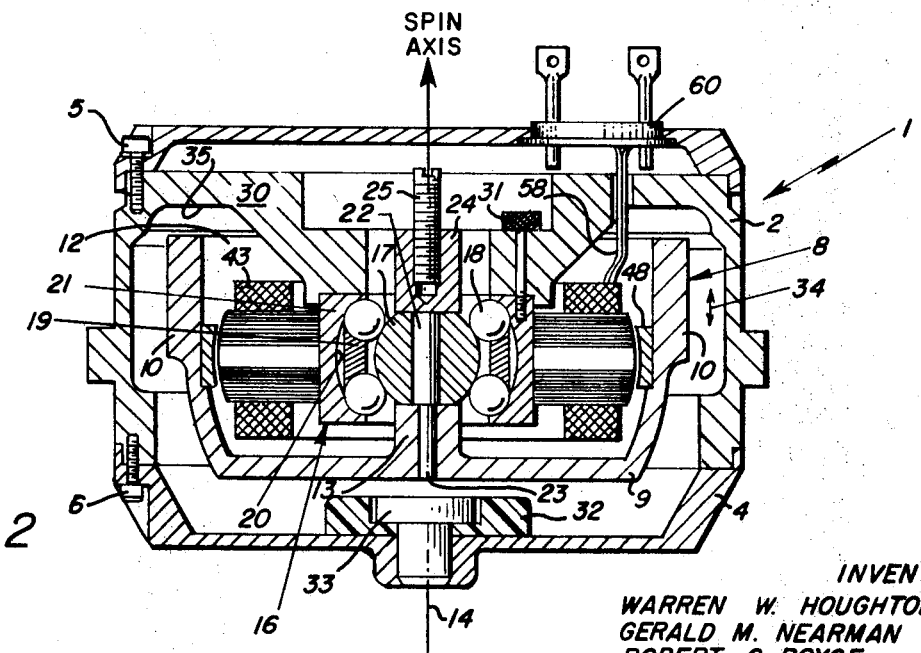
FIG. 2 is a detailed vertical cross-sectional view of the illustrative embodiment of the invention.

Referring to the drawings, particularly FIGS. 1 and 2, the illustrative embodiment of the invention is shown and designated 1. The gyroscope elements are mounted within a substantially rigid case member 2 having top and bottom cover members 3 and 4 secured thereto to provide a hermetically sealed envelope. Screws 5 and 6 are provided for retaining the respective cover members. The envelope is desirably filled with an inert gas, for example helium, at a pressure less than the atmospheric pressure. The inert gas filling reduces the windage losses and pumping effects of the rotor element of the over-all gyroscope. Further, the distribution of heat losses is enhanced evenly throughout the unit. Preferably a metal such as steel provides the required support of the gyroscopic elements and, in addition, shields the sensing coils from stray electromagnetic radiation.

The rotatable element or rotor 8 of the invention closely resembles an umbrella in over-all configuration defined by top wall 9, side wall 10 and an open end 12. A boss 13 extends inwardly from top wall 9 along the spin axis 14. The rotor bearing means including the spherical bearing designated generally 16 are disposed along the spin axis 14 and will now be described.

The spherical bearing means comprises a central sphere 17 which defines the inner race for a plurality of balls 18 constrained within suitable apertures in an annular retainer member 19. A concentric spherical surface 20 provided on the inner surface of member 21 defines the outer race and the central sphere is thereby free to rotate about three orthogonal axes. Axle 22 extends through the sphere 17 with the opposing ends 23 and 24 extending radially from the spherical surfaces. End 23 firmly engages the boss 13 to thereby secure the umbrella-shaped rotor to the spherical bearing means. End 24 may be silghtly enlarged and bears screw member 25 for support of trimming weight member 26, as shown in FIG. 1. The bearing provides for rotation of the central sphere while member 21 and the outer race 20 remain stationary. Such rotation results in lower ball speeds with a corresponding increase in the life of the bearings. The rotor 8 is balanced about the central axis of the spherical member 17 and the trimming weight is located on the rotor center line to permit final balancing about the two sensing axes.

Case member 2 includes a reentrant metallic wall portion 30 to which the outer spherical race-defining member 21 is secured, illustratively, by knurled hexagonal bolts 31. All stationary components of the embodiment will be supported by the case through the reentrant wall portion. The rotor together with its appended components is supported by the spherical bearing means 16.

It has unlimited freedom of rotation about the spin axis 14 with approximately 5° of movement in the two orthogonal axes. A stop 32 of a durable insulating material, such as Teflon, controls this limited movement of the rotor and may be secured to the case bottom cover 4 by cementing or a recessed press fit retainer 33. Rotor open end 12 is free to move in the direction indicated by the double-ended arrow 34 in FIG. 2 and is prevented from interference with the clearance wall surfaces 35 on the underside of member 30 by the stop 32.

Figures 3, 4, 5:
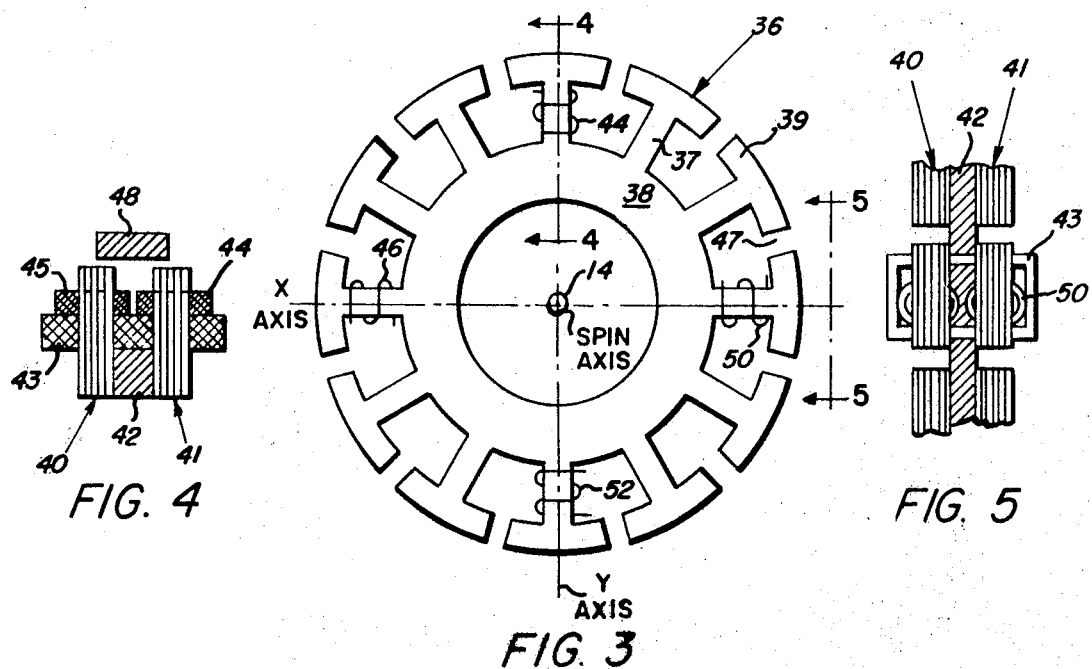
FIG. 3 is a perspective view of one of the stator laminations of the illustrative embodiment.
FIG. 4 is a cross-sectional view taken along the line 4—4 in FIG. 3.
FIG. 5 is a partial cross-sectional view of the internal coil assembly taken along the line 5—5 in FIG. 3.

Referring next to FIGS. 3, 4 and 5, all the stationary components performing the motor drive, pickoff and torquer signal generation functions are combined in a unitary electromagnetic assembly. Two stacks of a plurality of laminated members 36 form the composite stator assembly of the over-all motor drive. Each laminated member 36 is provided with radial arms 37 extending from a hub portion 38 and terminating in spaced substantially T-shaped bars 39 with an opening 47 therebetween. The stacked laminations in the sub-assemblies designated 40 and 41 in FIG. 4 are separated by a non-magnetic member 42 to define an insulated gap in the stator assembly. Coil windings 43 define in combination with the stator laminations and a hysteresis ring the electromagnetic actuating means for the gyro motor. The motor drive of the illustrative embodiment consists of a synchronous hysteresis motor designed to operate at a substantial high revolution rate of approximately 24,000 r.p.m. An angular momentum of approximately $2 \times 10^6$ gm.-cm.$^2$/sec. is obtained with an over-all gyro case of only 3 inches in diameter.

Referring again to FIG. 4, one of the traditional components, specifically the pickoff coils 44 and 45, will be observed as being wound around the stator assembies 40 and 41. These coils provide an AC electromagnetic circuit based on the variable reluctance of a magnetic circuit at a specific point of orientation. The pickoff members are located 90° apart in order that the two gyroscope axes are sensed. Hence, the Y axis will be sensed by the coils 44 and 45, while another pickoff assembly designated generally 46 is located on the mutually perpendicular or X axis and is of similar construction. The motor coil 43 acts as the primary for the variable reluctance transformer. The position of the hysteresis ring member 48 of a high-retentivity magnetic steel located on the inside of the rotor relative to the two stator stacks 40 and 41 determines the variable reluctance of the magnetic path for each pickoff coil. The difference between the two voltages induced in the pickoff secondary is amplified and fed into a conventional balancing network to generate a DC signal and establish corrective movement of the rotor with regard to the stator assembly.

The torquer function is performed utilizing the same variable reluctance principle as discussed with regard to the pickoff coils. The torquer windings 50 and 52 are therefore located on mutually perpendicular axes 90° apart on the stator arms not utilized for the pickoff coils. In this instance, however, DC excitation is employed and when the current in coil 50 exceeds that in the companion coil 52 a force is exerted on the hysteresis ring 48 attracting it towards the pole center of the higher current coil. In this manner torque control is provided and in the balanced state the currents in the two torquer coils will be substantially equal and no precession torques will be applied. While torquing is desired the current in one coil is increased while the current in the companion coil is decreased by a similar amount. The torquing rate provided will thereby be directly proportional to the control current.

Figure 6:
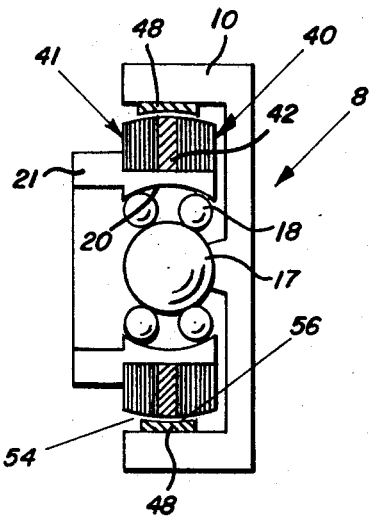
FIG. 6 is a diagrammatic representation of the umbrella-type rotor of the invention.

Referring next to FIG. 6, the remaining rotatable component of the invention is illustrated. Hysteresis ring member 48 located equatorially on the inside of the side wall 10 of rotor 8 defines with the fixed stator assembly a substantially constant gap 54 throughout the travel of the rotor assembly. A novel and unique feature of the invention resides in the provision of a surface 56 on the inside diameter of the hysteresis ring ground to a spherical radius to provide for a constant rotor-stator gap as the rotor travels about any axis. This construction tends to minimize motor reaction torques. Further, the spherical bearing and rotor integral assembly of the invention eliminates the need for providing a split hysteresis ring or stator.

Connections to the external circuitry associated with the motor drive, pickoff coils and torquer windings are made through a plurality of lead wires 58 to mulltipin terminal connector 60. The ends 61 of the terminals provide for the circuit connections. In an illustrative embodiment of the invention a 2-phase, 1200 c.p.s. supply was employed as a power source for the motor. With this supply the approximate total power consumed at speeds of 24,000 r.p.m. is approximately 10 watts.

The inertial gyroscope is operated in substantially the same manner as conventional two-degree-of-freedom devices. The initial nulling is accomplished by gyroscopic torquing, for example, the gyroscope torquer applies a torque about one axis which causes precession about an orthogonal axis. The torquing is continued until the gyroscope pickoffs are contained at null. In the platform environment an input about one of the gyroscope sensing axes causes precession about the orthogonal axis, resulting in a pickoff output. This signal is used to drive the platform gimbals to return the gyroscope to null. The platform gimbal angles are a measure of the inputs to the gyroscope. In this manner an inertial reference is obtained. There is thus contained in a simple and low cost structure a gyroscopic device capable of performing all the essential functions of prior art devices with a minimum number of critical components. The spherical bearing combines the functions of the motor bearings as well as the two gimbals and their associated bearings required for the two sensing axes while the stationary components supported by the outer race of this bearing combine all the electromagnetic drive or signal functions.

Numerous modifications, alterations and variations will be evident to those skilled in the art. The method of balancing and trimming the high speed rotatable components as well as the means for the limiting of the angular movement of the rotatable rotor about two of the axes will also be subject to many alternative configurations. It is, therefore, intended that all such modified embodiments be considered within the spirit and scope of the invention.

What is claimed is:

1. A gyroscope comprising:
   rotor means carrying an equatorially and inwardly disposed magnetic ing;
   spherical ball bearing means journalling said rotor means for unlimited rotation about a first axis and limited pivotal movement about second and third axes orthogonal to said first axis;
   electromagnetic stator coil means carried on said bearing means;
   means coactive with said magnetic ring to energize said electromagnetic means for imparting rotational movement to said rotor means;
   and means for generation of ac electrical signals indicative of the position of said magnetic ring relative to said stator coil means and dc electrical signals for application of a precessing torque to said rotor means disposed on said stator coil means.

2. A gyroscope comprising:
   a case member;
   rotor means carrying an equatorially and inwardly disposed hysteresis ring;
   spherical ball bearing means journalling said rotor means for unlimited rotation about a first axis and limited pivotal movement about second and third axes orthogonal to said first axis;

said bearing means comprising an outer stationary race and an inner movable race;

an electromagnetic stator coil assembly mounted on the outer spherical ball bearing race for actuating in cooperation with said hysteresis ring the rotational movement of said rotor means;

and signal generator variable reluctance pickoff means and precessing torque control means mounted on said stator coil assembly.

3. A gyroscope according to claim 2 wherein said signal generator pickoff means and precessing torquer control means are disposed radially on said stator coil assembly substantially 90° apart.

4. A gyroscope according to claim 2 wherein said stator assembly comprises two stacks of laminated members spaced apart by a member of a nonmagnetic material.

5. In a gyroscope having a case, rotor, means for mounting said rotor for unlimited rotation about a spin axis and limited pivotal movement about two orthogonal axes;

said mounting means comprising a spherical ball bearing defining an inner race secured to said rotor and an outer race fixedly secured to said case;

an integral electromagnetic stator coil actuating means carried by said outer race together with signal generator means and torquer control means disposed on said stator coil means to coact with and control the movement of said rotor.

References Cited

UNITED STATES PATENTS

| | | | |
|---|---|---|---|
| 2,269,103 | 1/1942 | Harding et al. | |
| 2,649,808 | 8/1953 | Slater et al. | 74—5 |
| 2,827,788 | 3/1958 | Campbell | 74—5 |
| 3,027,471 | 3/1962 | Burgwin et al. | |
| 3,142,182 | 7/1964 | Dane | 74—5.7 XR |
| 3,183,725 | 5/1965 | Frye | 74—5.7 |
| 3,250,497 | 5/1966 | Glass | 74—5.6 XR |
| 3,274,837 | 9/1966 | Fenton et al. | 74—5.7 |
| 3,339,421 | 9/1967 | Warnock | 74—5.7 XR |

FRED C. MATTERN, JR., Primary Examiner

M. A. ANTONAKAS, Assistant Examiner

U.S. Cl. X.R.

74—5.7